United States Patent Office 3,484,390
Patented Dec. 16, 1969

3,484,390
CHELATING RESIN COUPLING PRODUCT OF DIAZOTIZED CELLULOSE AND DITHIZONE OR OXINE
Albert J. Bauman, Sierra Madre, Norman Weliky, Granada Hills, and Howard H. Weetall, Monterey Park, Calif., assignors to California Institute Research Foundation, Pasadena, Calif., a corporation of California
No Drawing. Filed Feb. 25, 1966, Ser. No. 529,959
Int. Cl. C08b 21/34, 27/72; B01j 1/08
U.S. Cl. 260—2.2                             10 Claims

ABSTRACT OF THE DISCLOSURE

This patent describes a chelating resin particularly adapted for the removal of trace metal ions from dilute aqueous solutions made by attaching a diazotizable amino function to a modified cellulos ebackbone by means of a bridging reaction. The polymer thus formed is then diazotized and coupled to any organic metal-chelating agent which will undergo the coupling reaction. The hydrophilic nature of the cellulose matrix is such that the chelating resin formed is readily wetted by aqueous solutions of the trace metal ions.

---

The invention described herein was made in the performance of work under NASA contract and is subject to the provisions of the National Aeronautics and Space Act of 1958, Public Law 85–568 (72 Stat. 326; 42 U.S.C. 2451), as amended.

This invention relates to a novel method for the recovery of metal ions from highly dilute solutions. More particularly, this invention pertains to a new technique for the concentration of metal ions at high dilution by means of chelating resins which are obtained by coupling an organic chelating agent to an organic polymer having a plurality of aromatic amino structures. This invention is of particular significance in the field of chemistry, geochemistry, electroplating, oceanography, power generation, and biology, and to the chemistry and biochemistry of extraterrestrial bodies.

Deionizing agents are widely used in the plastic, chemical, drug, cosmetic and synthetic rubber manufacturing industries, as well as the mirror silvering and similar industries. In de-mineralizing units, these materials are employed to furnish non-scaling boiler feed, condenser coolants, and the like for power installations.

Various deionizing and ion exchange systems have been developed in the past utilizing the various mineral-derived materials or various synthetic organic chemical compositions. In conventional ion exchange resins, ion exchange reactions are effected with soluble electrolytes in aqueous medium contacted therewith. The predominant mechanism is the establishment of equilibrium in a chemical reaction involving the labile ion of the ion exchange material and the corresponding ion of the soluble electrolyte. These materials are frequently expensive, and in any event do not completely deionize since their operation involves the exchange mechanism. It has therefore also been proposed to utilize various chelating agents in order to accomplish the deionization of water or the removal of certain ions from solutions. However, the commonly available chelating agents are generally not suitable for the concentration of metal ions wherein the metal ions are initially present in high dilution.

Accordingly, it is a principal object of the present invention to provide novel chelating resins adapted for the removal of metal ions at high dilution from aqueous solutions.

Another object of the present invention is to provide a novel group of chelating resins.

A further object of the present invention is to provide a means for the preparation of novel chelating resins.

Still another object of the present invention is to provide a method for the concentration of metal ions at high dilution by means of novel chelating resins wherein the process is carried out on a continuous large scale basis.

These and other objects of the present invention will become apparent from the detailed description which follows.

Briefly, the present invention comprises a novel chelating resin which is the coupling reaction product of a polymer containing a plurality of diazotized aromatic amino groups and an organic metal-chelating agent.

Any polymer containing the aromatic amino groups may be diazotized and used in the practice of our invention. If the polymer does not initially contain aromatic amino groups, it may be modified to incorporate such groups by any of the techniques known to those skilled in the art. Alternatively, the organic chelating agent may first be modified prior to coupling with the diazotized polymer. In general, any polymer capable of diazotization, that is, containing a plurality of aromatic amino groups, may be utilized as a backbone to carry the chelating groups. Typical of such a polymer is polyamino polystyrene. Many other polymers which do not normally contain aromatic amino groups may be treated to incorporate such groups. Thus, for example, carboxycellulose may be reacted with benzidine through a carbodiimide link in order to incorporate the aromatic amino groups on the cellulose structure. In any event, the aromatic amino groups are thereafter diazotized at low temperature of from −10° to +10° C. with alkali nitrites utilizing conventional techniques. The diazotized polymer may then be reacted with any conventional chelating agent which will undergo the diazo coupling reaction, including amines, phenols, active methylene group compounds (e.g. dithizone, acetonylacetone), hydroxyquinolines (e.g. oxine), nitroparaffins and proteins.

We have found that the novel chelating resins of the present invention react with metal cations to give colors specific for each cation, and thus are useful for the qualitative and semi-quantitative analysis of cation mixtures. According to the present invention, utilizing the novel chelating resins, heavy metal such as gold may be recovered quantitatively from sea water. Likewise it is possible to qualitatively separate cation mixtures on sheets of the novel resin of this invention. The new chelating resins of our invention are also useful for hydrogeochemical prospecting, for clinical treatment of heavy metal poisoning, and for extractive metallurgy in general, including radioactive isotopes. The novel chelating agents of this invention may also be utilized to recover metals from very dilute solutions by means of column chromatographic procedures.

According to one embodiment of the invention, organic chelating agents such as dithizone and oxine may be coupled to cellulose modified to contain diazotized aromatic amino groups to provide a novel chelating resin. The operation is carried out by attaching benzidine to carboxymethyl cellulose, then coupling the organic chelating agent to the benzidine.

The following examples are presented solely to illustrate the invention and should not be regarded as limiting in any way. In the examples, the parts and percentages are by weight unless otherwise indicated.

EXAMPLE 1

Preparation of Dithizone Cellulose Chelating Resin

A commercially available carboxymethyl cellulose (CMC) (sold under the name Bio-Rad Cellex-CM) in powdered form and containing 0.7 meq./gm. of carboxymethyl groups is first washed with weak 4,N-hydrochloric acid and then the acid is washed out to provide the cellulose in the free acid rather than the salt form. The CMC is then soaked for one week at room temperature in a solution excess in benzidine and N,N'-dicyclohexyl carbodiimide. The solvent is water containing 10% by volume methanol. After the week's soak, the CMC is washed free of N,N'-dicyclohexyl carbodiimide and benzidine with methanol, toluene, methanol and finally water. The colorless product is then ready for diazotization. The diazotization is carried out with sodium nitrite at 0–5° C. in accordance with the procedure described in "Azo and Diazo Chemistry" by H. Zollinger, Interscience Publishers, New York (1961). A thorough wash with cold 10% aqueous solution of sulfamic acid and then water yields the diazonium cellulose as a bright yellow fairly stable solid. An excess of dithizone (3-mercapto-1,5-diphenylformazan) is dissolved in potassium hydroxide where at a pH of about 12 it forms an orange solution. The diazonium cellulose is then added quickly with stirring at 10–15° C. whereupon it couples at once. The material is then stored in a refrigerator at about 10° C. for more than 24 hours. Then the excess solution is washed out with distilled water and the maroon solid stirred into 2 N iron-free hydrochloric acid to convert the material to the green dithizonic acid form. The material is then washed free of hydrochloric acid with distilled water and dried in the dark at about 40° C. The cellulose chelating resin obtained is stable for many months in the dark and is directly suitable for use in the removal of metal ions present in aqueous solutions at high dilutions.

EXAMPLE 2

Preparation of oxide cellulose chelating resin

Diazonium cellulose prepared as in Example 1 is added with stirring at 10 to 15° C. to an aqueous solution of oxine which has been previously adjusted to a pH of about 8 with potassium hydroxide. Coupling immediately occurs to yield a chelating resin which is oxine cellulose.

EXAMPLE 3

Preparation of p-dimethylaminobenzylidenerhodanine cellulose chelating resin

Again following the procedure of Example 1, diazonium cellulose is obtained. An excess of p-dimethylaminobenzylidenerhodanine is dissolved in aqueous potassium hydroxide solution at a pH of about 8. Upon the addition of the diazonium cellulose, coupling occurs quickly at about 10° C. to yield a chelating cellulose resin.

EXAMPLE 4

Chelating resin from dithizone and aminated polystyrene

A chocolate-colored finely powdered aminated polystyrene having a particle size of about 100 microns (sold commercially by Eidanger Salpeter Fabriken of Norway) is diazotized at about 0° C. with sodium nitrite to yield a yellow powder. This material is then poured into an aqueous dithizone solution having a pH of about 13. A green chelating resin was obtained. When a dilute solution of zinc ions was added to this resin, the zinc was removed from the solution as was evidenced by the red characteristic color of the zinc chelate.

Carboxymethyl cellulose sheet paper, e.g., Whatman CM–81, may be treated in accordance with the procedure described in Example 1 to yield "dithizone paper." For column chromatographic purposes, powdered dithiozone cellulose is preferred. In any event, the dithizone cellulose is olive green in color at substantially neutral pH, purple in strong acids, and orange in bases. Upon contact with heavy metal ions, the dithizone cellulose normally changes color to some shade of red or orange.

The following examples illustrate the effectiveness of dithizone cellulose in the removal of ions from solutions.

EXAMPLE 5

Small amounts of lead, zinc and cupric nitrate solutions (100 p.p.m. in each cation and pH 5.4) were added to dithizone cellulose paper. At this pH, the spot areas formed on the dithizone paper were in direct proportion to the total amount of cations applied, and in agreement with the findings of the prior art for precipitation chromatography. The pH environment of the metal ions was shown to affect their affinity for the dithizone cellulose paper as follows: Three identical spots of the metal-ion mixture were applied to the paper. The spots were immediately overspotted, one with 3 N hydrochloric acid, a second with an identical volume of 0.1 hydrochloric acid and a third one with distilled water. At high acidity there was observed general migration of the ions without separation. However, the spot treated with weak acid showed separation into three areas. The original olive green dithizone paper showed the center to be composed of a brown spot ringed by an intermediate purple-brown and outer bright crimson ring. Tests of individual cations have shown that the distinctive outer ring which moves with the acidic chromatographic front is zinc, while lead moves more slowly, and copper remains at the origin.

EXAMPLE 6

Small columns of powdered dithizone cellulose were prepared in accordance with Example 1 and used to collect heavy metals from known mixtures. A mixture of cobalt, nickel, copper, silver, zinc, cadmium, lead and mercury, each at about 200 p.p.m. in solution, were passed through a small dithizone cellulose column. The cation solution at pH 3.5 was passed through the column, which was then washed with a volume of water equal to that of the sample (10 ml.) and at the same pH. A similar test was conducted at pH of 8.5. Both columns together with controls were subjected to spectrographic analysis. The results showed that at the acid pH lead was held quantatively and at basic pH nickel and mercury were so held.

EXAMPLE 7

Samples of dithizine cellulose powder were stirred for 24 hours with solutions excess in zinc and copper, and adjusted to various pH levels. Zinc and copper ions were collected best at pH 5.

EXAMPLE 8

Clean sea water was collected directly off the pier and at La Jolla, California, in large polyethylene carboys. In each run 20 gram columns of dithizone cellulose, 2,4 cm. ID by 5.5 cm. high, were used. The water was not filtered. About 10–20 liters of water were passed through the columns which quickly turned from green to red at about 10–100 ml./min. The columns were then washed with 3–5 bed volumes of glass-distilled water to a negative chloride test then eluted with hydrochloric acid and ammonium hydroxide, successively. The residual fractions obtained from the acid and base wash were weighed, and then subjected to emission spectrographic analysis. Given the spectrographic data on a column and the fractions eluted it is possible to calculate the total recovered weight of each element. All of these weights may be totaled to give the grand total of all cations recovered from the column. In this way it is possible to calculate the percentage of such metal recovered in the grand total. Similar calculations for solid sea salt enables one to compare the sets of data and obtain an enrichment factor for each element as compared with solid sea salt. This enrichment factor is a direct measure of the efficiency of the column. If there is no enrichment, the value would be 1. The following table shows the data for one sea water column run.

matic amino groups and an organic metal-chelating agent selected from the group consisting of dithizone and oxine, to remove said ions from the solution.

5. The method of claim 4 wherein the organic metal-chelating agent is dithizone.

6. The method of claim 4 wherein the organic metal-chelating agent is oxine.

7. The method of claim 4 wherein the resin is subsequently regenerated by contact with acid or base.

8. A novel method for the continuous recovery of

TABLE 1

| Metal | Sea water, p.p.m.[b] | Percent of total solids [b] | Column packing, μg. recovered | 0.05N HCl eluate, μg. recovered | 0.5N HCl μg. recovered | 3N HCl μg. recovered | 1N NH₄OH μg. recovered | Total enrichment ratio |
|---|---|---|---|---|---|---|---|---|
| Mg | 1,272 | 3.68 | 3,200 | $2.3 \times 10^4$ | 700 | 2,400 | 9.5 | $4.0 \times 10^{-1}$ |
| Ca | 400 | 1.16 | $9.2 \times 10^4$ | $4.4 \times 10^4$ | 700 | 1,700 | 20 | 2.18 |
| Sr | 13 | $3.77 \times 10^{-2}$ | | 620 | | | | 1 |
| Cu | 0.01 | $3 \times 10^{-5}$ | 740 | 130 | 42 | 980 | 2 | $2.2 \times 10^3$ |
| Ag | 0.003 | $1 \times 10^{-6}$ | 600 | 97 | 51 | 610 | | $4.2 \times 10^4$ |
| Au | 0.000006 | $2 \times 10^{-8}$ | | | 1,100 | $8.5 \times 10^3$ | | $2.7 \times 10^7$ |

The foregoing data show quantitive recovery of silver, copper and gold. It can also be seen that the dithizone cellulose chelates well with magnesium, calcium and strontium. There is no advantage to eluting the columns with base after acid elution because they are essentially clean after acid elution.

The powdered form dithizone cellulose is a good trace cation collector used either in batch or column form. Thus, it is immediately apparent that this material is suitable for a large scale continuous commercial operation in which the dithizone cellulose is intermittently regenerated by treatment with acid or base washes.

Having fully described the invention, it is intended that it be limited only by the lawful scope of the appended claims.

We claim:

1. A novel chelating resin comprising the coupling reaction product of a carboxymethyl cellulose containing a plurality of diazotized aromatic amino groups and an organic metal-chelating agent selected from the group consisting of dithizone and oxine.

2. A novel chelating resin comprising the coupling reaction product of carboxymethyl cellulose containing a plurality of diazotized aromatic amino groups and dithizone.

3. A novel chelating resin comprising the coupling reaction product of carboxymethyl cellulose containing a plurality of diazotized aromatic amino groups and oxine.

4. A novel method for the recovery of metal ions from a highly dilute solution which comprises contacting a dilute solution of metal ions with a novel chelating resin comprising the coupling reaction product of carboxymethyl cellulose containing a plurality of diazotized aromatic amino groups and an organic metal-chelating agent selected from the group consisting of dithizone and oxine, to remove said ions from the solution.

metal ions from a highly dilute solution which comprises contacting a dilute solution of metal ions with a novel chelating resin comprising the coupling reaction product of carboxymethyl cellulose containing a plurality of diazotized aromatic amino groups and an organic metal-chelating agent selected from the group consisting of dithizone and oxine to remove said ions from the solution, and continuously recovering the ions from a part of the resin and regenerating the resin by treatment with acid or base.

9. A novel composition of matter comprising in powdered form the coupling reaction product of carboxymethyl cellulose containing a plurality of diazotized aromatic amino groups and dithizone.

10. A novel composition of matter comprising in powdered form the coupling reaction product of carboxymethyl cellulose containing a plurality of diazotized aromatic amino groups and oxine.

References Cited

FOREIGN PATENTS 11,564  4/1956  Germany.

OTHER REFERENCES

Parrish, Chem. and Ind. 1956, 137.
Davies et al., J. Appl. Chem. 9, 368–71 (1959).
Gibson et al., J. Appl. Chem. 16, 50–53 (1966).

WILLIAM H. SHORT, Primary Examiner

M. GOLDSTEIN, Assistant Examiner

U.S. Cl. X.R.

210—24, 30; 260—13, 79, 93.5